United States Patent Office 3,126,325
Patented Mar. 24, 1964

3,126,325
ASSAY METHOD FOR ANTIMICROBIAL
SUBSTANCES
George M. Poole, Greenfield, Ind., assignor to Eli Lilly
and Company, Indianapolis, Ind., a corporation of
Indiana
No Drawing. Filed Dec. 15, 1961, Ser. No. 159,769
4 Claims. (Cl. 195—103.5)

This application is a continuation-in-part of copending application Serial No. 85,180, filed January 27, 1961, and now abandoned.

The present invention relates to a novel method and means for assaying antimicrobial substances. More particularly, it relates to a novel preparation and method for measuring the proportion of antimicrobial substances in compositions comprised thereof.

The assay of antimicrobial substances is generally carried out by the so-called "diffusion" method, in which serial dilutions of the material undergoing assay are applied in uniform aliquots to porous discs resting upon a solid culture medium which has been inoculated with a microorganism known to be sensitive to the antimicrobial substance. When the resulting culture is incubated at growth temperature, it is found that the growth of the microorganism is inhibited over an area surrounding the discs which varies in proportion to the concentration of antimicrobial substance. By comparison of the resulting areas with the areas produced by known dilutions, the concentration of antimicrobial substance in the unknown composition is readily determined.

This method, apart from the error resulting from variations in the permeability of the discs and the rate of diffusion of the liquid through the culture medium, has the important drawback that the cultures must be freshly prepared for each test, and cannot be preserved even for limited periods. Furthermore, the method requires a prolonged incubation period, sufficient to produce visible colonies of the microorganism. For these reasons, the method is not satisfactory for routine use under circumstances where rapid assays are necessary in order to control process conditions.

In a more recent method, described by Sacks in U.S. Patent 2,967,132 (January 3, 1961), the assay is carried out by incubating the antimicrobial substance in serial dilution with a suspension of bacterial spores in long, narrow glass tubes of an aqueous nutrient medium comprising glucose, $l$-alanine, buffer, and methylene blue or other dye which undergoes color change upon oxidation. This method, while more rapid, requires the use of bulky equipment and fresh admixture of culture ingredients for each test. The problems are not particularly simplified by the technique of Rdzok et al., U.S. Patent 2,931,757 (April 5, 1960), in which the required bacterial spores are preserved in dried form on filter paper, since it is necessary to disperse this preparation in the incubation mixture of Sacks, so that the essential nature of the test method remains unchanged.

It is an object of the present invention to improve the assay of antimicrobial substances.

Another object is to provide a rapid means for determining the concentration of antimicrobial substances.

Still another object is to provide assay means for antimicrobial substances, which means can be preserved and stored in a form ready for immediate use.

Other objects are to simplify the assay of antimicrobial substances and to improve the accuracy thereof.

Other objects of the invention and its advantages over the prior art will be apparent from the following description.

In one aspect, the present invention is an assay preparation especially adapted to the convenient determination of antimicrobial substances. Such a preparation comprises an absorbent carrier, such as a disc or strip of filter paper, fritted glass, porous plastic, or the like, having deposited thereon and/or therein spores of a microorganism of the family Bacillaceae which, during its vegetative growth cycle, elaborates a reducing substance or substances; a nutrient medium for the said microorganism containing an oxidizable substrate; a buffering material; and an indicator substance which undergoes a change in color when contacted with a reducing material. The completed preparation should be essentially free from any material having the power to reduce the indicator substance—i.e., it should not contain reducing substances in a concentration sufficient to cause a color change in the indicator substance. If the impregnated carrier is to be stored rather than used immediately, it should be dried to a moisture content, generally below about 2% by weight and preferably not more than about 1% by weight, insufficient to permit vegetative growth of the microorganism under the storage conditions.

In another aspect, the invention lies in a method, employing the said assay preparation, for determining antimicrobial substances, wherein a series of the impregnated carriers are moistened with an aqueous solution of the antimicrobial substance at a series of dilutions, and are then incubated, while being maintained in moistened condition, for a period of about one to about four hours or somewhat longer at growth temperature for the microorganism. Simultaneously, another series of the impregnated carriers are similarly treated and incubated under the same conditions with a series of known dilutions of the antimicrobial substance. In each series, one test will be found which represents the maximum dilution at which the indicator substance does not change color. These dilutions represent identical concentrations of the antimicrobial substance; and from the known dilutions, the concentration of the antimicrobial substance in the unknown composition can be readily calculated.

The present invention is readily adapted to the determination of antimicrobial substances in general, by which is meant the broad group of substances included within the terms antibiotics, bactericides, germicides, fungicides, antiseptics, bacteriostatic agents, coccidiostatic agents, and the like. Among such substances are the sulfa drugs, penicillins, streptomycins, tetracyclines, erythromycins, bacitracin, terramycin, thimerosal, nitromersol, phenols, nitrofurans, nitrobenzamides, arsenobenzenes, imidazole carboxamides, and the like, such substances being well known and fully described in the prior art. The antimicrobial substance is prepared for assay by dissolving in water or by extraction into water, and the assay is carried out upon the aqueous solution. If desirable to improve solvency, an organic solvent may be used in combination with water; and in such cases the control tests should employ the identical solvent system.

The microorganisms employed in the present invention should form spores which can be lyophilized or otherwise dried without material loss in viability, which elaborate a reducing substance during vegetative growth in a nutrient medium containing an oxidizable substrate; and which are susceptible to control by the antimicrobial substance which it is desired to assay. These requirements are satisfied by the microorganisms of the family Bacillaceae, which numbers two genera, Bacillus and Clostridium. Suitable species include *B. globigii, B. stearothermophilus, B. cereus, B. subtilis, C. sporogenes, C. butyricum, C. acetobutylicum*, and the like. Pathogenic organisms can be employed if desired, such as *C. tetani, C. botulinum, C. histolyticum, C. welchii*, and the like, but are preferably avoided in the interest of safety. Especially suitable is *B. subtilis*, which forms highly stable spores, which rapidly resumes vegetative growth when moistened and subjected to mild temperature conditions, and which is sensitive to a wide range of antimicrobial substances. This organism can be used, for example, for the assay of thimerosal, nitromersol, penicillin G, erythromycin, tylosin, desmycosin, hygromycin, neomycin, hexachlorophene, desmethyltetracycline, dibutyltin oxide, and numerous others.

The indicator substances employed in the present invention operate by way of their property of changing color when acted upon by the reducing substances resulting from the growth of the microorganism in its vegetative or germination phase. It is necessary, therefore, for the indicator substance to be present initially in the oxidized form, and that the proportion of reducing substance eventually elaborated by the microorganism be sufficient to cause a color change to take place. Among the suitable indicator substances are sodium 2,6-dichlorobenzenoneindophenol (which changes from blue to colorless under reducing conditions), 2,3,5-triphenyltetrazolium dichloride (colorless to red), methylene blue (blue to colorless), Bindschedler's green (light green to colorless), indigo carmine (blue to colorless), resazurin (blue to red, then to colorless), sodium 3'-chloroindophenol (blue to colorless), sodium benzenoneindo - 3' - sulfonaphthol (brown to colorless), and numerous others, readily ascertainable from the art. For positive and reproducible results, it is preferred that the indicator substance have an oxidation-reduction potential greater than about $+0.1$ v., relative to hydrogen, although substances having a lower potential can be satisfactorily employed.

Many of the substances useful as indicators in the present invention are themselves antimicrobial in some degree. It is to be understood in all cases that the indicator substance is to be employed at less than the minimum proportion which is toxic to the test microorganism at growth conditions. A suitable proportion of any particular indicator substance can be readily ascertained by addition thereof in serial dilutions to cultures of the microorganism according to well-known techniques. The indicator substance can be employed in any proportion, below the toxic level, which permits the color change to be observed. It is desirable, after the assay composition has been moistened, to bring it promptly to growth temperature, in order to avoid any toxic effect upon the microorganism prior to entering the growth phase.

Many of the indicator substances have a tendency to change color with changes of pH. To minimize or avoid this tendency, it is desirable to incorporate into the assay mixture a buffer substance, such as a sodium phosphate buffer, a sodium acetate buffer, a sodium citrate buffer, or the like. The concentration of buffer is not critical, but may satisfactorily lie in the range of about 0.05 to about 0.5 molar in the assay liquid. The buffer should be chosen to produce a pH around the optimum growth range for the microorganism employed. In general it can be said that organisms of the family Bacillaceae grow well in the range of pH 5.5 to 9, preferably around pH 6.5 to 7.5, optimally around pH 7. Suitable buffer compositions to regulate the pH within the desired range are readily ascertainable from the prior art.

The nutrient medium employed in the assay composition should contain essentially no materials which tend to reduce the indicator substance, for reasons stated above, but otherwise may have a conventional composition, adapted to the growth of the microorganism being employed. For this purpose, the nutrient medium should contain an oxidizable energy source such as a carbohydrate, preferably glucose, a nitrogen source, and the usual vitamins and minerals. Typical nutrient media are illustrated below in the operating examples.

In order to produce a significant result as rapidly as possible, it is desirable that the assay composition contain a heavy inoculum of spores, so that an effective amount of reducing substances will be elaborated as rapidly as possible in the presence of an ineffective proportion of antimicrobial substance. To this end, a spore suspension is employed containing at least about $10^5$ and up to about $10^{10}$ or more cells per milliliter. It will be apparent that considerably higher proportions of cells can be employed as desired, but the incubation time tends to be undesirably long if lower proportions of cells are employed.

The preparation of the new assay composition and device is conveniently carried out in the following way. A nutrient medium for the test organism is prepared having a conventional composition except that it contains no more than around 25% of the oxidizable substrate (e.g., glucose) that is eventually to be employed. This basic medium is sterilized under the usual conditions (suitably at around 115 to 125° C.). It is then cooled to ambient room temperature, during and/or after which it is aerated by exposure to sterile air or by stirring in the presence of air, this being an important operation for obtaining a satisfactory end product. To the sterile, aerated medium are then added the remainder of the oxidizable substrate and the desired quantity of the buffering composition, and any solid materials are dissolved. Thereafter, the indicator substance is added in the desired proportion and the test organism is added in the form of spores to the desired cell concentration, this being the preferred order of addition. The resulting mixture is applied to small circles or strips of filter paper or the like. For 13-mm. circles of filter paper, for example, about 0.1 ml. of the mixture is sufficient for saturation. The impregnated circles are dried to a low moisture content as promptly and rapidly as possible under controlled temperature conditions, suitably ordinary or reduced temperatures below about 35° C., preferably by lyophilization, thereby protecting the organism against attack by the indicator substance, and avoiding premature growth. The resulting discs can be stored in screw-capped brown bottles for extended periods without deterioration.

The assay preparations of the present invention can be employed in a variety of ways and with a variety of techniques. Most conveniently, however, they are employed in conjunction with a spot plate or a plate or board having mounted thereon a series of shallow plastic cups (e.g., polyethylene, polypropylene, polystyrene, or the like). Into each of the spots or cups is placed a disc or strip impregnated with the assay composition of the invention, a measured amount of an aqueous solution of the antimicrobial substance is added, and the cup is sealed with a suitable cap or with pressure-sensitive tape to minimize loss of moisture therefrom. The seal should be sufficiently tight to exclude air in all cases where an anaerobic organic organism is employed or where the indicator substance tends to be oxidized by contact with air (e.g., methylene blue, indigo carmine, resazurin, or the like). The completed assembly is incubated promptly at a temperature of about 30–37° C. for about one to about four hours, the time varying inversely with the temperature. At the same time, a similar series of tests are run with known dilutions of the antimicrobial substance. When the incubation is complete, each series will shown one or more tests in which a color change has occurred and one or more tests at lower dilutions in which the color has remained substantially unchanged, assuming that the dilutions covered a sufficiently wide range. When this occurs, the tests in both series at the maximum dilution at which no color change occurred represent the same degree of dilution of the antimicrobial substance, and further represent its minimum inhibitory concentration. From these facts, the concentration of antimicrobial substance in the unknown material can be readily calculated.

The invention will be more readily understood from the following operating examples, which are submitted solely for the purpose of illustrating the invention, and not as a limitation upon the scope thereof.

Example 1

Assay discs were prepared in the following manner, starting with a culture medium having the following composition.

Basic medium:                                G.
   Dextrose _____ 0.1
   Bacto peptone _____ 0.5
   NaCl _____ 0.35
   $K_2HPO_4$ _____ 0.37
   $KH_2PO_4$ _____ 0.13
   Difco yeast extract _____ 0.15
   Difco beef extract _____ 0.15
   Distilled water, 100 ml.

The basic medium was sterilized for 10 minutes at 120° C. and allowed to cool overnight in contact with sterile air. To the medium were then added the following substances in crystalline form.

Additions:                                   G.
   Dextrose _____ 0.5
   $K_2HPO_4$ _____ 1.25
   $KH_2PO_4$ _____ 0.38

The mixture was stirred until all of the solids had dissolved. Finally, the following materials were added sequentially.

Dye substance: 7.0 ml. of 0.1 weight-percent 2,6-dichlorobenzenoneindophenol (No. 3463, Eastman) in 0.1 M potassium phosphate buffer solution, pH 7.2.
Spore suspension: 10 ml. of a suspension of *B. subtilis* spores containing about $2.7 \times 10^9$ cells/ml.

The dye solution was prepared fresh, and the dye and spores were added to the mixture only a few minutes before use. Into this mixture were dipped 12.7 mm. filter pads (S and S analytical filter paper No. 740E). The pads were touched against the side of the container to remove the dripping excess, and were placed flat in a stainless-steel pan having a sieve-like bottom. They were then frozen at −15° C. and were dried in the frozen state to a moisture content just below 1 percent by weight. The dried pads were transferred to a screw-capped brown bottle containing desiccant capsules and were stored in a cool, dry place. Each of the pads prepared in this way contained about $2.7 \times 10^7$ cells. When tested for sensitivity by moistening with serial dilutions of thimerosal in water at 5, 4, 3, 2, 1, 0.5, 0.4, 0.3, 0.2, 0.1, and 0.0 p.p.m. and incubating at 30–32° C. for 2 hours, the pads remained dark blue down to 0.3 p.p.m., while the control pad and those diluted to 0.2 and 0.1 p.p.m. became colorless. The pads were thus shown to have a sensitivity between 0.3 and 0.2 p.p.m. of thimerosal.

Example 2

*Clostridium sporogenes*, obtained from a soil tube culture, was inoculated into tubes of thioglycollate broth having the following composition:

g./l.
Pancreatic digest of casein _____ 15.0
*l*-Cystine _____ 0.5
Dextrose (anhydrous) _____ 5.0
Yeast extract _____ 5.0
Sodium chloride _____ 2.5
Sodium thioglycollate _____ 0.5
Resazurin _____ 0.001
Agar _____ 0.75
Water _____ Remainder The inoculated tubes were incubated for one week at 37° C., and were then pooled and centrifuged. The supernate was decanted and discarded, and the solids were resuspended in 0.2 M pH 7.2 phosphate buffer, filtered to dispose of the ager, and centrifuged again. The supernate was decanted, and the cells were again suspended in buffer, 1.5 ml. Microscopic examination of the suspension showed many spores and a few drumstick shapes.

The suspension was used to prepare assay discs according to the method of Example 1, but with about 50 percent less dye. When assay discs were moistened and placed in the incubator at 37° C. overnight, they changed from blue to white, while pads containing 0.12 ml. of aqueous 5 p.p.m. thimerosal solution remained blue.

Example 3

Assay discs were prepared according to the method of Example 1, employing 0.05 weight-percent of resazurin and 10 ml. of a suspension of *Bacillus subtilis* spores containing about $2.7 \times 10^9$ cells per milliliter.

The resulting blue discs were used for assaying penicillin G by moistening with serial dilutions of penicillin G in water, sealing in a plastic cup, and incubating at 37° C. for 4 hours. At 1 p.p.m. and higher concentrations, the assay pads turned pink, while at lower concentrations they turned white.

Example 4

Assay discs were prepared according to the method of Example 1, employing 0.5 weight-percent of 2,3,5-triphenyltetrazolium chloride and 30 ml. of a suspension of *B. subtilis* spores containing about $2.7 \times 10^9$ cells per milliliter.

The assay discs were tested as follows: One disc was placed in a small plastic cup with 0.12 ml. of water and sealed with pressure-sensitive tape. Another disc was similarly treated, but with 0.12 ml. of an aqueous 100 p.p.m. solution of thimerosal instead of water. The discs were simultaneously incubated at 37° C. Within one hour, the disc treated with water alone had turned red, while the disc treated with aqueous thimerosal solution remained white.

Example 5

Serial dilutions of tylosin were assayed, employing the assay discs and procedure of Example 1. For comparison, two blank controls were run, and also one control with 0.1 ml. of an aqueous 0.5 p.p.m. solution of thimerosal. Upon completion of the test, both blank controls had turned white; the thimerosal control was still the original blue; and the tylosin tests turned from dark blue to very light blue in the interval between 1 p.p.m. and 10 p.p.m.

Example 6

Similar tests were carried out upon desmycosin, which showed a change from dark blue to medium blue in the interval of 1 p.p.m. to 10 p.p.m.

Example 7

Serial dilutions of diphenyleneiodonium sulfate, carried out by the method and means of Example 1, showed complete inhibition at 10 p.p.m., and nearly complete inhibition at 5 p.p.m., as evidenced by a slight color change at the latter concentration.

Example 8

Assays were carried out by the method and means of Example 1 upon a series of chicken feed mixtures containing coccidiostatic compounds, as follows.

Compound:                                  Content, percent
  (1) Arsenobenzene _____ 4
  (2) 4,5-imidazoledicarboxamide _____ 12
  (3) Furacin _____ 11
  (4) 3,5-dinitrobenzamide _____ 60
  (5) 3,5-dinitro-m-toluamide _____ 25
  (6) Nitrophenide _____ 25

Each of the materials was extracted with water, and the extracts were serially diluted to yield solutions containing 5, 50, and 500 p.p.m. of the active material, assuming complete extraction. Each dilution was tested by the method and means of Example 1, the incubation being at 37° C. for 2.5 hours. The results were as follows:

Compound 1 showed essentially complete inhibition at 5 p.p.m.

Compounds 3, 4, and 5 showed substantially complete inhibition at 50 p.p.m.

Compounds 2 and 6 showed no inhibition at 500 p.p.m., thus indicating that the compounds are either of low water solubility, or of low activity against *B. subtilis.*

I claim:

1. An assay method for antimicrobial substances, employing assay means which comprise an inert, absorbent carrier having deposited thereon spores of a microorganism of the family Bacillaceae, a culture medium for said microorganism containing an oxidizable substrate, a buffering composition effective to produce a pH between about 5.5 and about 9, and an indicator substance in oxidized form which changes color upon being reduced, said indicator substance being present in a proportion nontoxic to said microorganism under growth conditions, and said assay means initially containing an insufficient proportion of water to permit vegetative growth of said microorganism, said method comprising the steps of moistening a series of said assay means with serial dilutions of an aqueous solution of an antimicrobial substance, and incubating the moistened assay means in shallow, individual containers under growth conditions for the microorganism contained therein, while maintaining said assay means in moistened condition, for a time sufficient to cause a color change in said assay means in the absence of antimicrobial substances.

2. The method of claim 1 wherein said microorganism is a member of the genus Bacillus, said oxidizable substrate is glucose, and said buffering composition is a phosphate buffer effective to produce a pH between about 6.5 and about 7.5.

3. An assay method for antimicrobial substances, employing assay means which comprise absorbent paper having deposited thereon spores of a microorganism of the genus Bacillus, a glucose-containing culture medium for said microorganism, a phosphate buffer effective to produce a pH between about 6.5 and about 7.5, and a dye in oxidized form which changes color upon being reduced, said dye being present in a proportion nontoxic to said microorganism under growth conditions, and said assay means initially containing an insufficient proportion of water to permit vegetative growth of said microorganism, said method comprising the steps of moistening two series of said assay means with aqueous solutions of an antimicrobial substance at serial dilutions, one series at known concentrations and the other at unknown concentrations of said antimicrobial substance, and incubating the moistened assay means in shallow, individual containers under growth conditions for the microorganism contained therein, while maintaining said assay means in moistened condition, for a time sufficient to cause a color change in at least one, but not all, of the assay means in each of said series.

4. An assay method as in claim 3 wherein said assay means comprise a filter paper pad having deposited thereon spores of the microorganism *Bacillus subtilis,* and wherein said dye is 2,6-dichlorobenzenoneindophenol.

References Cited in the file of this patent

UNITED STATES PATENTS

| | | |
|---|---|---|
| 2,931,757 | Rdzok et al. | Apr. 5, 1960 |
| 2,967,132 | Sacks | Jan. 3, 1961 |
| 2,981,606 | Keston | Apr. 25, 1961 |
| 3,002,892 | Dooley | Oct. 3, 1961 |